United States Patent [19]
Hörnfeldt et al.

[11] Patent Number: 6,006,097
[45] Date of Patent: Dec. 21, 1999

[54] METHOD FOR DETERMINING POSITION OF MOBILE COMMUNICATION TERMINALS

[75] Inventors: Jan Hörnfeldt, Färentuna; Lennart Rinnbäck, Järfälla, both of Sweden

[73] Assignee: Telefonaktiebolaget L M Ericsson (publ), Stockholm, Sweden

[21] Appl. No.: 08/977,470

[22] Filed: Nov. 24, 1997

[51] Int. Cl.[6] .................................................. H04Q 7/22
[52] U.S. Cl. .................... 455/456; 455/422; 342/463; 701/207
[58] Field of Search .................... 455/440, 436, 455/456, 422, 403, 404, 414, 461; 701/200, 207; 342/357.16, 450, 457, 458, 463, 465

[56] References Cited

U.S. PATENT DOCUMENTS

| | | | |
|---|---|---|---|
| 5,317,323 | 5/1994 | Kennedy et al. | 342/457 |
| 5,327,144 | 7/1994 | Stilp et al. | 342/387 |
| 5,508,708 | 4/1996 | Ghosh et al. | 342/457 |
| 5,613,205 | 3/1997 | Dufour | 455/440 |
| 5,615,409 | 3/1997 | Forssén et al. | 455/440 |
| 5,666,662 | 9/1997 | Shibuya | 455/456 |
| 5,675,344 | 10/1997 | Tong et al. | 342/457 |
| 5,901,358 | 5/1999 | Petty et al. | 455/456 |
| 5,907,809 | 5/1999 | Molnar et al. | 455/456 |

FOREIGN PATENT DOCUMENTS

| | | | |
|---|---|---|---|
| 0631453 | 12/1994 | European Pat. Off. | H04Q 7/04 |
| 0 717 580 A2 | 6/1996 | European Pat. Off. | |
| 4409178 | 9/1995 | Germany | G01S 5/06 |
| WO 92/05672 | 4/1992 | WIPO. | |
| 9312590 | 6/1993 | WIPO | H04B 7/26 |
| WO 95/26510 | 10/1995 | WIPO. | |
| 9600486 | 1/1996 | WIPO | H04Q 7/38 |
| 9625830 | 8/1996 | WIPO | H04Q 7/38 |
| WO 96/31076 | 10/1996 | WIPO. | |
| 9714257 | 4/1997 | WIPO | H04Q 7/22 |
| WO 97/27711 | 7/1997 | WIPO. | |
| 9730360 | 8/1997 | WIPO | G01S 5/14 |
| 9815150 | 4/1998 | WIPO | H04Q 7/38 |

OTHER PUBLICATIONS

Ulf Forssén et al., "*Adoptive Antenna Arrays for GSM900/DCS1800,*" Proceedings of IEEE Vehicular Technology Conference, pp. 605–609 (Mar. 1994).

T.S. Rappaport et al., "*Position Location Using Wireless Communications on Highways of the Future,*" IEEE Communications Magazine, pp. 33–41 (Oct. 1996).

"Time Difference of Arrival Technology for Locating Narrowband Cellular Signals" *TDOA Overview*, ©1997 The Associated Group, http://www.trueposition.com/tdoa.htm. pp. 1–9.

*Primary Examiner*—William G. Trost
*Attorney, Agent, or Firm*—Jenkens & Gilchrist, P.C.

[57] ABSTRACT

A number of different solutions are described for gathering access delay and distance measurement information for use in determining the position of a cellular mobile station. For all of these solutions, one frequency and one uplink channel in each cell are dedicated for position determination. In one aspect of the present invention, a method is provided for determining the position of a mobile station using handover procedures for all of the cells or certain predefined cells in the network. One uplink channel is dedicated within each cell in the network to be used for position determination. These positioning channels continuously listen for handover access requests. Cells detecting the access bursts can measure the access delay and determine the distance to the requesting mobile station. A triangulation calculation is used to pinpoint the mobile station's position. In another aspect of the present invention, a method is provided for determining the position of a mobile station using position determination procedures for all of the cells or certain predefined cells in the network.

16 Claims, 4 Drawing Sheets

METHOD FOR DETERMINING POSITION OF MOBILE COMMUNICATION TERMINALS

BACKGROUND OF THE INVENTION

1. Technical Field of the Invention

The present invention relates in general to the mobile communications field and, in particular, to a method for determining the position of mobile terminals in a cellular communications system.

2. Description of Related Art

There is a widening range of cellular communications applications where it is becoming important to know the geographic position of the mobile stations (terminals) being used. For example, it is important to know the position of mobile stations being used to make or respond to emergency calls. Similarly, it is important to know the position of mobile stations being used in vehicles for fleet management purposes (e.g., taxis).

A number of methods for determining the position of cellular mobile stations either exist or have been proposed. For example, a terminal-based method for determining the position of cellular mobile stations is to manufacture the mobile stations with built-in Global Positioning System (GPS) receivers. In operation, each mobile station regularly transmits GPS-derived position information to a network on the uplink.

Another terminal-based method that has been used for determining the position of cellular mobile stations is implemented in a system marketed by TruePosition™. This system has been used for determining the position of standard analog mobile radio terminals which operate in accordance with the IS-54 protocol. The TruePosition system has its own listening radio base stations and is operated independently of the cellular systems. As such, different cellular networks can share the same TruePosition position determination system. Upon request, the TruePosition system provides position information for individual mobile stations within the different cellular networks.

A network-based method for determining the position of cellular mobile stations is disclosed in commonly-assigned Swedish Patent Application No. 9603561-3 to R. Bodin. In order to determine the position of a mobile station, a handover procedure is initiated between a serving base station and the mobile station. The mobile station transmits access request signals to a new base station. The base station measures the time delay for the access request signal to travel between the mobile station and the base station. This procedure is repeated between the mobile station and one or more additional base stations. A service node in the cellular network calculates the position of the mobile station by utilizing information about the known positions of the base stations and the measured access time delays.

This network-based method of determining the position of cellular mobile stations relies on so-called "asynchronous" handovers, where the target base stations measure the access delays to the mobile station. Each access delay is used as a measure of the distance between the mobile station and the respective base station. At least two positioning handover operations are needed to obtain three such distances, which can be used in a triangulation algorithm to determine the mobile terminal's position. Notably, one distance can be obtained between the serving base station and the mobile terminal without a positioning handover. For example, in the Global System for Mobile Communications (GSM), the Timing Advance (TA) value used for time alignment of bursts can optionally be used as a representation of the distance in the serving cell. A more accurate position determination can be attained if more than two such positioning handovers are made, because more than three distances will be known. The use of more than three distance measurements compensates for some errors arising in the individual measurements.

FIG. 1 is a diagram that illustrates a handover sequence that can be used to determine the position of a mobile station, as disclosed in the above-described Swedish patent application to R. Bodin. The method 10 shown is preferably used in a GSM network. As shown, three positioning handovers are made to base stations BS1, BS2 and BSN (where N=3 in this application), respectively. Notably, a significant problem to be resolved is that these handovers are made in sequence.

For example, a first handover command (12) is transmitted from the serving base station to the mobile station whose position is to be determined. The mobile station then transmits a handover access request message (14) to a first base station BS1 whose location is known. The handover access request message is only being used by base station BS1 to measure the access delay. Consequently, base station BS1 is not required to transmit a response to the mobile station. After a predetermined time has passed, the mobile station stops waiting for a response to the access request message, and reverts back (16) to the original channel connection with the serving base station. The handover sequence is then repeated (18, 20, 22) for a second base station BS2 to measure the access delay, and again (24, 26, 28) for a third base station BS3 which again measures the respective access delay.

As mentioned above, the positioning handovers are made in sequence, with each handover (e.g., in a GSM network) taking approximately 0.5 seconds to complete. In fact, the mobile station's timeout procedure takes about 0.3 seconds alone to complete. Consequently, a shortcoming of the above-described sequential method is that the total time it takes to determine the mobile station's position is proportional to the number of cells in which the positioning handovers are made. As such, the risk of losing a call increases proportionally with the number of positioning handovers being made. Furthermore, it is difficult to compensate for timing errors in the mobile station, because these errors can vary with frequency, and the positioning handovers are made on different frequencies for the different cells. Also, the distance measurements are being performed at different points in time, which leads to inaccurate distance measurements when the mobile station continues to move. For example, if a mobile station is traveling at 200 km/h, the positioning inaccuracy caused by this movement is on the order of 0.1 km. Another shortcoming of the above-described method is that the number of measurement points is limited to the number of cells that are known to the network as being the serving cell's neighboring cells. As described below, the present invention successfully overcomes all of these shortcomings.

SUMMARY OF THE INVENTION

In accordance with the present invention, a number of different solutions are provided for gathering access delay and distance measurement information for use in determining the position of a cellular mobile station. Preferably, for all of these solutions, one frequency and one uplink channel in each cell are dedicated for position determination. Also, an important pre-condition for these solutions is that the network is synchronized (i.e., the air-interface timing of the base stations in the network is aligned). In one aspect of the present invention, a method is provided for determining the position of a mobile station using handover procedures for all of the cells or certain predefined cells in the network. One uplink channel (CH_pos) is used within each cell in the network for position determination. These positioning channels continuously listen for handover access requests. Cells detecting the access (request) bursts can measure the access delay and determine the distance to the requesting mobile station. Triangulation is used to pinpoint the mobile station's position. In another aspect of the present invention, a method is provided for determining the position of a mobile station using position determination procedures for all of the cells or certain predefined cells in the network.

An important technical advantage of the present invention is that only one set of access requests is needed, and the distance measurement results can be reported from the base stations in all cells directly after the access bursts are detected. As such, there is no need to wait for a mobile station to timeout (e.g., because of a handover failure) before the positioning information can be reported.

Another important technical advantage of the present invention is that for two of the embodiments no handover orders are made. Consequently, there is no risk of losing calls on the basis of missed handover orders.

Still another important technical advantage of the present invention is that for two other embodiments, only one handover order is made. Consequently, the risk of losing a call is always the same regardless of the number of neighbor cells involved.

Yet another important technical advantage of the present invention is that since all cells are making access delay and distance measurements based on the same access burst, a timing error in the mobile station can be readily compensated for because it adds only a constant offset to all measurements made by the cells.

Still another important technical advantage of the present invention is that all access delay and distance measurements are made simultaneously in all cells. Consequently, there are no inaccuracies created due to the movement of the mobile station.

Another important technical advantage of the present invention is that all cells that can detect the access bursts transmitted from the mobile station will contribute to the position determination results. Consequently, in areas with many overlapping cells, additional cells that are not included in the serving cell's neighboring cell information can detect the access bursts and also contribute to the position determination results.

Still another important technical advantage of the present invention is that dedicated base station receivers can be used for the position determination functions. These dedicated receivers can be designed to better handle time dispersion, and also be more sensitive along with increased access delay measurement accuracies than existing receivers.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–7 of the drawings, like numerals being used for like and corresponding parts of the various drawings.

Figure 1:
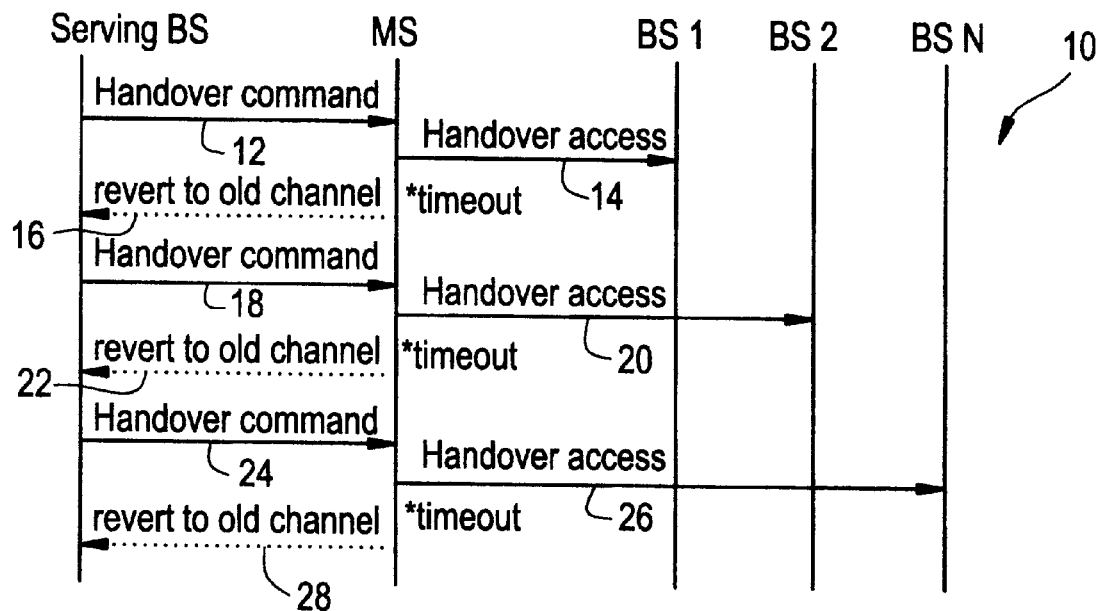
FIG. 1 is a diagram that illustrates a prior art handover sequence that can be used to determine the position of a mobile station.
Figure 2:
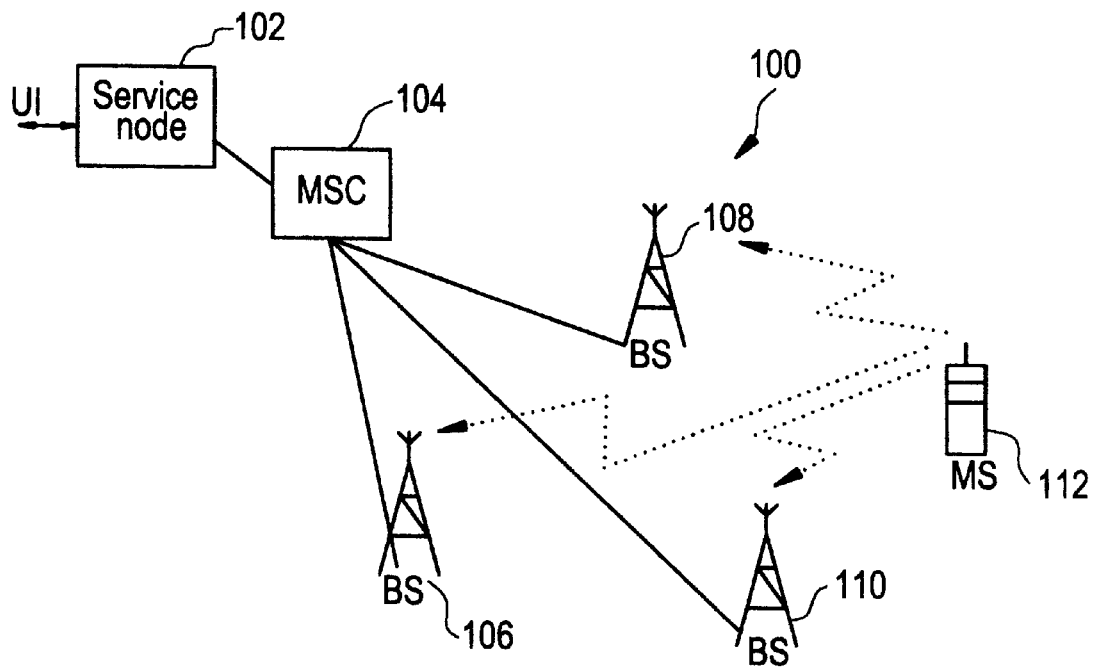
FIG. 2 is a block diagram of a cellular mobile network that can be used to implement a method for determining the position of a mobile station.
Figure 3:
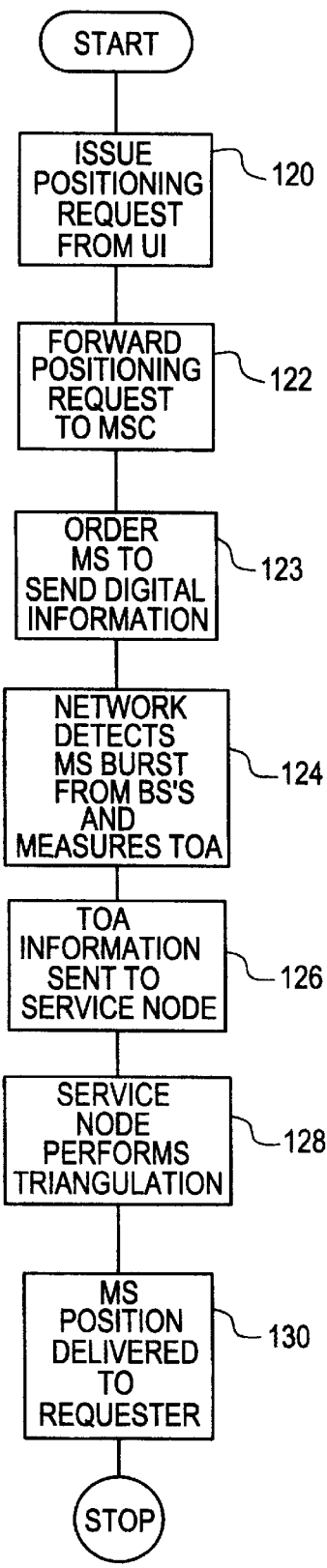
FIG. 3 is a flow diagram that summarizes the mobile station position determination method that can be implemented by the network shown in FIG. 2.

Commonly-assigned U.S. patent application Ser. No. 08/917,577 (attorney docket no. 27946-00288) discloses a method for determining the position of a mobile station. FIG. 2 is a block diagram of a cellular mobile network 100 that can be used to implement this position determination method. FIG. 3 is a flow diagram that characterizes this method. For example, at step 120, a request to determine the position of a mobile station 112 is issued at the user interface (UI) of a mobile positioning service node 102. At step 122, the request is forwarded from the service node 102 to the mobile services switching center (MSC) 104 in the cellular mobile network 100. If the cellular network is a GSM network, then the MSC 104 shown in FIG. 2 corresponds to a MSC and base station controller (BSC) in the GSM network.

At step 124, the cellular network 100 detects digital information, which is transmitted from the mobile station 112, at a plurality of base stations (at least three base stations such as BSs 106, 108 and 110) having different antenna locations. The cellular network performs a measurement for the time of arrival (TOA) of the digital information received at each base station site. This digital information can either be ordered by the cellular network from the mobile station 112 (e.g., when a new connection has to be established, or a handover is ordered) at step 123, or it can be the usual digital information transmitted from the mobile station (e.g., speech frames).

At step 126, the information related to the TOA measurement is transmitted from the base stations 106, 108 and 110, and routed to the mobile positioning service node 102 via the MSC 104. At step 128, the service node 102 performs a triangulation calculation based on the TOA measurement information and the known coordinates of the base stations 106, 108 and 110. At step 130, the position information for the mobile station 112 is delivered to the requester via the UI of the service node 102.

Specifically for a GSM system, the delay of the signals transmitted from the mobile station to the serving base station is measured at call setup and at (asynchronous) handover. At those times, the mobile station is transmitting access bursts at known times (relative to a control signal received in the mobile station from the serving base station). The serving base station receives the access bursts and measures their access delays, as illustrated in FIG. 4.

Figure 4:
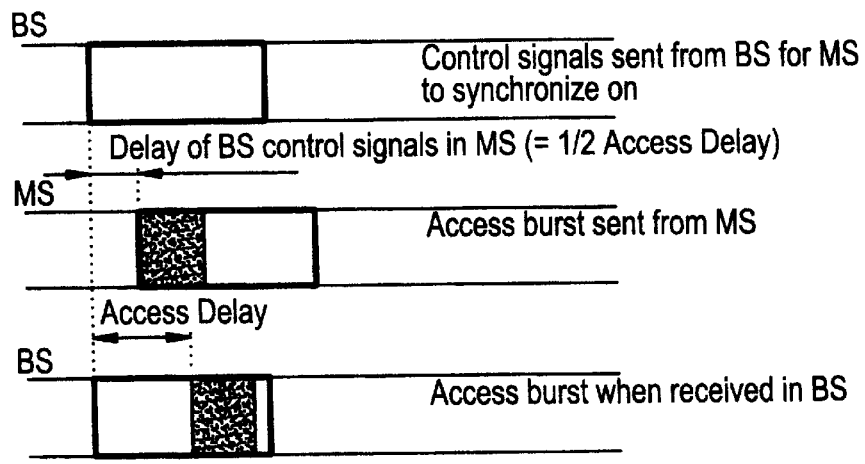
FIG. 4 is a diagram that illustrates a signal format used by a serving base station to receive access bursts and measure their access delays.

Referring to the signal format shown in FIG. 4, it can be noted that the access delay is a round-trip measure of the delay between a base station and a mobile station. First, the control signal transmitted from the base station to the mobile station is delayed. Then the access burst transmitted from the mobile station to the base station is delayed. These two delays make up the access delay. As such, if the distance between the base station and mobile station is too long, then a second time slot has to be used to detect the pertinent access burst.

Essentially, the method of the present invention provides a number of different solutions for gathering distance measurement information. Preferably, for all of these solutions, one frequency and one (uplink) channel in each cell are dedicated for the position determination function.

In accordance with a preferred embodiment of the present invention, a first method is provided for determining the position of a mobile station using handover procedures for all cells (BS1–BSN) in the network. One uplink channel (CH_pos) is used within each cell in the network for position determination. These positioning channels are used continuously to listen for handover access requests. The following description for FIGS. 5 and 6 can be used to implement the method for performing the distance measuring functions of step 124 in FIG. 2.

Figure 5:
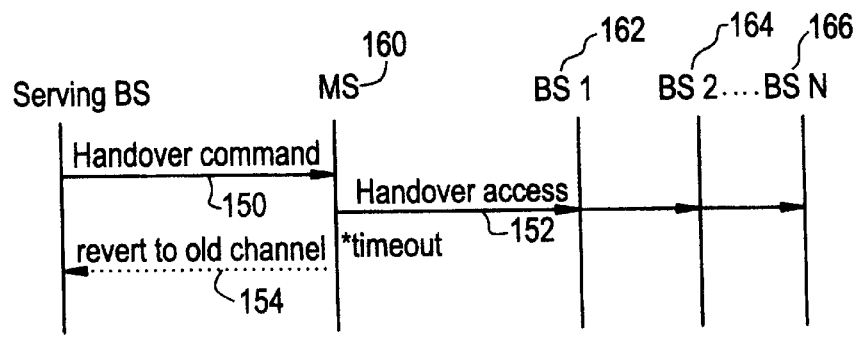
FIG. 5 is a sequence diagram that illustrates a method for determining the position of a mobile station using standard handover procedures for all cells or certain predefined cells in a network, in accordance with a preferred and second embodiment of the present invention.
Figure 6:
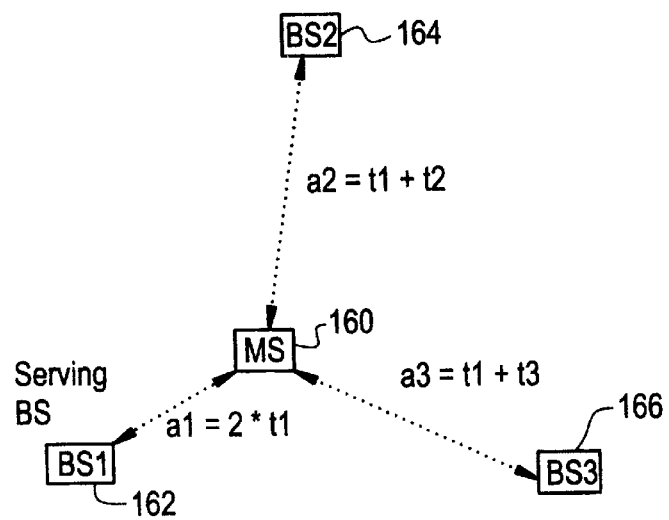
FIG. 6 is a block diagram of a cellular mobile network that can be used to implement the method shown in FIG. 5.

Referring to FIGS. 5 and 6, the cellular network orders the mobile station to perform an asynchronous handover to the serving base station (or possibly to a neighboring base station) with a HANDOVER COMMAND message (150), and assigns a unique handover reference to the mobile station. The mobile station then transmits a handover access request (152) on the uplink positioning channel (CH_pos), which includes the unique handover reference. As such, for this embodiment, since all of the cells in the network (e.g., BS1–BSN) have an uplink CH_pos defined, all cells that cover the mobile station can detect the same handover access request.

The base stations in all cells that detect the handover access request from the mobile station measure the respective access delays. Note that an important pre-condition for implementing the present invention is that the air-interface timing of the base stations in the network is aligned. In the example illustrated by FIG. 6, the base stations (162, 164 and 166) in three cells (N=3) have detected the handover access request from mobile station 160. The one-way delay between the mobile station and each of these base stations is denoted as t1, t2 and t3, respectively. The corresponding measured access delays are denoted as a1, a2 and a3.

As shown in FIGS. 5 and 6, the mobile station 160 has transmitted the message along with the unique handover reference to the control signal transmitted from base station BS1 (162). Consequently, the access delay measured in base station BS1 (162) is a measure of two times the delay between the mobile station 160 and base station BS1 162 (i.e., round-trip delay). In the second base station BS2 (164), the access delay measured is first a measure of the delay in transmitting the handover access request relative to the control signal from the first base station BS1 (162). In other words, the access delay is equal to t1 plus the delay between the mobile station and the second base station BS2 (164) for the handover access request (i.e., t2). Similarly, the access delay for the third base station BSN (166) (where N=3) is t1+t3.

The handover references are collected by the network and used as the references for the mobile station (160) whose position is being determined. The network then uses the access delay values as a measure of the delay of the signals, which are transformed to a measure of the respective distance between the mobile station and each base station. This raw distance data is transferred to a service node to perform triangulation calculations, which pinpoint the mobile station's position. As such, no cell in the network needs to respond directly to the HANDOVER ACCESS request message received, because the handover procedure is inhibited for position determinations. After a predetermined time, a timeout period is completed, and the mobile station 160 reverts to the original channel, in accordance with standard procedures (e.g., for the GSM).

In accordance with a second embodiment of the present invention, a second method is provided for determining the position of a mobile station using standard handover procedures, but for a subset of the cells in the network. This second method essentially follows the steps described above for the preferred embodiment. However, a difference in this second method is that the positioning channel (CH-pos) is activated only in a predefined number of cells. In this embodiment, the network decides which of the cells will take part in the mobile station's position determination (e.g., certain of the serving cell's neighboring cells) and activates the CH-pos in each of those cells. After the position determination steps have been completed (e.g., as in FIG. 5), this second method adds a step that causes the network to release the associated positioning channels (CH-pos), so that those channels can again be used for other non-position determining purposes.

In accordance with a third embodiment of the present invention, a third method is provided for determining the position of a mobile station, which utilizes position determination procedures (as opposed to handover procedures) for all cells in the network. Again, one uplink channel (CH_pos) is used within each cell in the network for the position determination functions. These positioning channels continuously listen for positioning access requests. The following description for FIGS. 6 and 7 can be used to implement the method for performing the distance measuring functions of step 124 in FIG. 2.

Figure 7:
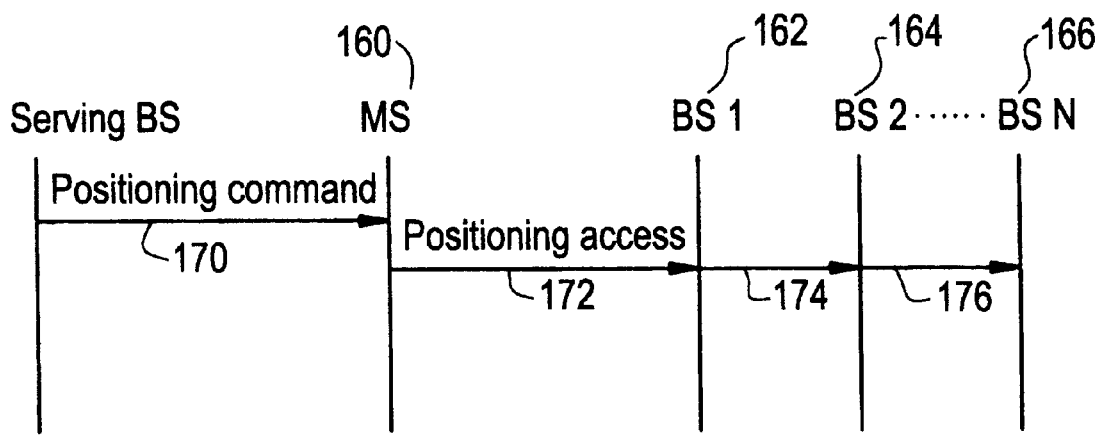
FIG. 7 is a sequence diagram that illustrates a method for determining the position of a mobile station using position determination procedures for all cells or certain predefined cells in a network, in accordance with a third and fourth embodiment of the present invention.

Referring again to FIG. 6, and the sequence diagram for determining the position of a mobile station in FIG. 7, at step 170, the cellular network (e.g., via the serving base station) transmits a POSITIONING COMMAND message on the old channel used for communication with the mobile station 160, which orders the mobile station to 160 to transmit access bursts on the CH-pos and perform a position determination procedure, and also assigns a unique positioning reference to the mobile station. At step 172, the mobile station 160 responds to the POSITIONING COMMAND message by transmitting one to several positioning access requests on the positioning channel (CH-pos) along with the unique positioning reference, while maintaining the original connection with the serving base station. Note that when the positioning channel (CH-pos) is using the same air interface timeslot as the original (ongoing) connection, the positioning access request will interfere with the ongoing connection, because the mobile station cannot transmit on two frequencies at the same time. Consequently, no burst can be transmitted for the ongoing connection, which will cause a burst to be lost on the network side for the ongoing connection. However, there will be no noticeable degradation resulting for that connection.

At steps 174 and 176, since all cells (BS1-BSN) in the network have an uplink positioning channel (CH-pos) defined, all of the cells (e.g., BS1–BS3 in the FIGURE) that cover the mobile station 160 can detect the same positioning access request being transmitted by the mobile station.

The base stations in all cells that detect the positioning access request from the mobile station 160 can measure the respective access delays. In the example illustrated by FIG. 6, the base stations (162, 164 and 166) in three cells (N=3) have detected the positioning access request from mobile station 160. The one-way delay between the mobile station and each of these base stations is denoted as t1, t2 and t3, respectively. The corresponding measured access delays are denoted as a1, a2 and a3.

As shown in FIGS. 5 and 6, the mobile station 160 has transmitted the message with the unique positioning reference with respect to the control signal transmitted from base station BS1 (162). Consequently, the access delay measured in base station BS1 (162) is a measure of two times the delay between the mobile station 160 and base station BS1 162 (i.e., round-trip delay). In the second base station BS2 (164), the access delay measured is first a measure of the delay in transmitting the positioning access request relative to the control signal from the first base station BS1 (162). In other words, the access delay is equal to t1 plus the delay between the mobile station and the second base station BS2 (164) for the positioning access request (i.e., t2). Similarly, the access delay for the third base station BSN (166) (where N=3) is t1+t3.

The positioning references are collected by the network and used as the references for the mobile station (160) whose position is being determined. The network then uses the access delay values as a measure of the delay of the signals, which are transformed to a measure of the respective distance between the mobile station and each base station (e.g., BS1–BS3). This raw distance data is transferred to a service node to perform the triangulation calculations, which pinpoint the mobile station's position.

In accordance with a fourth embodiment of the present invention, a fourth method is provided for determining the position of a mobile station using position determination procedures, but for a subset of the cells in the network. This fourth method essentially follows the steps described above for the third embodiment. However, a difference in this fourth method is that the positioning channel (CH-pos) is activated only in a predefined number of cells. In this embodiment, the network decides which of the cells will take part in the mobile station's position determination (e.g., certain of the serving cell's neighboring cells) and activates the CH-pos in each of those cells. After the position determination steps have been completed (e.g., as in FIG. 7), this fourth method also adds a step that causes the network to release the associated positioning channels (CH-pos), so that those channels can again be used for other non-position determining purposes.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for determining the position of a mobile station in a cellular communications network, comprising the steps of:

activating an uplink positioning channel in each of a plurality of cells in said cellular communications network;

transmitting a handover message to said mobile station responsive to a position request;

responsive to said handover message, said mobile station transmitting a handover access request on said uplink positioning channel;

responsive to a detection of said handover access request, a number of said plurality of cells determining a distance to said mobile station; and determining said position of said mobile station from said number of distances.

2. The method of claim 1, wherein the handover access request is accompanied by a unique reference.

3. The method of claim 1, wherein said plurality of cells comprises substantially all of the cells in said network.

4. The method of claim 1, wherein said plurality of cells comprises a predetermined number of the cells in the network.

5. The method of claim 1, wherein said distance is associated with an access delay.

6. The method of claim 1, wherein the determining said position step comprises at least one triangulation.

7. The method of claim 4, wherein said plurality of cells comprises a predetermined number of neighboring cells to a serving cell.

8. The method of claim 4, further comprising the step of deactivating said uplink positioning channel in said each of said plurality of cells.

9. A method for determining the position of a mobile station in a cellular communications network while maintaining a connection with said mobile station, comprising the steps of:

activating an uplink positioning channel in each of a plurality of cells in said cellular communications network;

transmitting a positioning message to said mobile station responsive to a position request;

responsive to said positioning message, said mobile station transmitting a positioning access request on said uplink positioning channel, said positioning access request transmitted as an access burst;

responsive to a detection of said positioning access request, a number of said plurality of cells determining a distance to said mobile station; and determining said position of said mobile station from said number of distances.

10. The method of claim 9, wherein the positioning access request is accompanied by a unique reference.

11. The method of claim 9, wherein said plurality of cells comprises substantially all of the cells in said network.

12. The method of claim 9, wherein said plurality of cells comprises a predetermined number of the cells in the network.

13. The method of claim 9, wherein said distance is associated with an access delay.

14. The method of claim 9, wherein the determining said position step comprises at least one triangulation.

15. The method of claim 12, wherein said plurality of cells comprises a predetermined number of neighboring cells to a serving cell.

16. The method of claim 12, further comprising the step of deactivating said uplink positioning channel in said each of said plurality of cells.

* * * * *